(12) United States Patent
Ishihara et al.

(10) Patent No.: US 9,447,614 B2
(45) Date of Patent: Sep. 20, 2016

(54) LID LOCK APPARATUS

(71) Applicant: HI-LEX CORPORATION, Takarazuka-shi, Hyogo (JP)

(72) Inventors: Hironari Ishihara, Takarazuka (JP); Yoichiro Moriyama, Takarazuka (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 14/067,123

(22) Filed: Oct. 30, 2013

(65) Prior Publication Data

US 2014/0117679 A1 May 1, 2014

(30) Foreign Application Priority Data

Oct. 31, 2012 (JP) ................................. 2012-240514

(51) Int. Cl.

| E05C 1/12 | (2006.01) |
|---|---|
| E05B 83/34 | (2014.01) |
| E05B 79/20 | (2014.01) |
| E05B 83/40 | (2014.01) |
| B60K 15/05 | (2006.01) |

(52) U.S. Cl.

CPC .............. *E05B 83/34* (2013.01); *B60K 15/05* (2013.01); *E05B 79/20* (2013.01); *E05B 83/40* (2013.01); *B60K 2015/0576* (2013.01); *B60K 2015/0584* (2013.01); *Y10T 292/0992* (2015.04)

(58) Field of Classification Search

CPC ........ E05B 83/34; E05B 79/20; E05B 83/40; B60K 15/05; B60K 2015/0576; B60K 2015/0584; Y10T 292/0992

USPC ....... 292/161, 163, 164, 171, 173, 137, 138, 292/DIG. 11, DIG. 53, DIG. 64, 143, 144; 296/97.22

See application file for complete search history.

(56) References Cited

U.S. PATENT DOCUMENTS

| 5,080,421 A * | 1/1992 | Otowa et al. ............... 296/97.22 |
| 5,611,580 A * | 3/1997 | Choi .............................. 292/164 |
| 6,234,556 B1 * | 5/2001 | Janssen ...................... 296/97.22 |
| 6,554,344 B2 * | 4/2003 | Son ............................. 296/97.22 |
| 6,808,226 B2 * | 10/2004 | Hirano .......................... 296/155 |
| 6,994,392 B2 * | 2/2006 | Seto ............................ 296/97.22 |
| 7,537,269 B2 * | 5/2009 | Tseng et al. ................... 296/155 |
| 7,766,410 B2 * | 8/2010 | Tseng et al. ............... 296/97.22 |
| 2006/0220412 A1 * | 10/2006 | Norton ......................... 296/97.2 |

FOREIGN PATENT DOCUMENTS

JP 2011-80301 A 4/2011

* cited by examiner

*Primary Examiner* — Kristina Fulton
*Assistant Examiner* — Christine M Mills
(74) *Attorney, Agent, or Firm* — Global IP Counselors, LLP

(57) ABSTRACT

A lid lock apparatus having a housing to be fixed to a vehicle body with limited space. The lid lock apparatus includes a locking pin, a cable, a linking member, a housing, a mating and fixing part, and a coil spring. The housing includes a locking pin housing part, which houses the locking pin, and a link housing part, which houses the linking member. The housing further includes a space that is interposed between the locking pin housing part and the link housing part is formed, and when the housing is rotated and thereby fixed to a fixed target, the link housing part is, at a fixed ending period, moved into a position of the space which has been defined at a fixed starting period.

3 Claims, 6 Drawing Sheets

LID LOCK APPARATUS

CROSS-REFERENCE TO RELATED APPLICATIONS

This application claims priority under 35 U.S.C. §119(a) to Japanese Patent Application No. 2012-240514, filed in Japan on Oct. 31, 2012, the entire contents of Japanese Patent Application No. 2012-240-514 are hereby incorporated herein by reference.

BACKGROUND OF THE INVENTION

1. Field of the Invention

The present invention relates to a lid lock apparatus and more specifically to a fuel lid lock mechanism of an automobile.

2. Description of the Related Art

A lid lock apparatus, which locks a lid such as a fuel lid that is used in a vehicle, is mounted to a vehicle body, and locks and unlocks the lid by remote operation. For example, as shown in FIG. 1, a fuel lid lock apparatus, which serves as the lid lock apparatus, is normally used on a vehicle body rear side of a minivan type vehicle body 20. On a side surface of the vehicle body 20, a rail 20a, which is located at the center of the side surface, and rails 20b, 20b, which are located at the upper end and the lower end of the side surface, are provided. On the side surface of the vehicle body 20, a sliding door 21, which is capable of sliding along the rails 20a, 20b, is mounted. A fuel lid 22 is provided on the side surface of the vehicle body 20 to the rear of the sliding door 21. A lid lock apparatus 1 includes: a motion converting mechanism 11; and a stopper 6, whereto motion from the motion converting mechanism 11 is transmitted and which suppresses the sliding of the sliding door 21. The motion converting mechanism 11 is disposed at the perimeter of the fuel lid 22, and the stopper 6 is provided in the vicinity of the center rail 20a. In addition, the stopper 6 is also sometimes provided to the upper and lower rails 20b.

One example of a lid lock apparatus for locking the fuel lid of an automobile is described in Japanese Unexamined Patent Application Publication No. 2011-080301. The lid lock apparatus described in Japanese Unexamined Patent Application Publication No. 2011-080301 includes a plunger, an inner cable, a stopper, a linking member, an engaging pin, and a lock lever. The plunger moves to protruding and retracting positions by the opening and closing of the fuel lid. The inner cable is pushed and pulled by the plunger. One end of the inner cable is connected to the stopper, which protrudes into and recesses out of an operation range of a sliding door. The linking member interlocks the protruding and retracting motion of the plunger with the push-pull motion of the inner cable, and pivots. The engaging pin moves, synchronized to the locking and unlocking of the sliding door. The lock lever is provided to the linking member and is capable of engaging with the engaging pin.

In the lid lock apparatus, while the plunger is being at the retracted position, the engaging pin engages with an engaged part of the lock lever when the engaging pin has moved in the plunger direction owing to the locking of the door. The lock lever is connected to the linking member, which is capable of pivoting in the direction that leads away from the engaging pin. In addition, the plunger is slidably connected to the linking member.

SUMMARY

The lid lock apparatus of the type described above is mounted to the vehicle body such that it is remotely operated by a cable and such that it engages with and detaches from the lid by a biasing member such as a spring. In the case of an automobile whose vehicle body has been reduced in weight or a vehicle body that requires a charging operation, such as an electric vehicle or a plug-in hybrid car, the mounting space of the fuel lid, the charging lid, and the like is limited. In addition, depending on the installation location of the fuel lid, the charging lid, and the like, there is a risk that it will be splashed by water, mud, and the like kicked up from the road surface. In such a case, it is necessary to store the lid lock apparatus inside a housing for the purpose of waterproofing.

An object of the present invention is to make it possible to fix a lid lock apparatus, which includes a housing, to a vehicle body with limited space.

As solution to the problem, the text below explains the aspects of the invention. These aspects can be arbitrarily combined as needed.

A lid lock apparatus according to one aspect of the present invention includes a locking pin, a cable, a linking member, a housing, a mating and fixing part, and a coil spring. The locking pin is configured to engage with and detaches from a lid. The cable is configured to operate the locking pin. The linking member is configured to transmit to the locking pin an operating force applied to the cable. The housing is configured to house the locking pin and the linking member. The mating and fixing part fixes the housing to a fixed target by being mated to the fixed target and being rotated. The coil spring biases the locking pin in a direction in which the locking pin is pushed out of the housing.

Here, the locking pin is disposed in the housing such that the locking pin can protrude from a protruding hole of the housing. The linking member includes a locking pin connecting part connected to the lock pin, and a cable connecting part connected to a cable end of the cable.

In addition, the puling operation of the cable allows the linking member to move in a direction in which the locking pin is stored in the housing, and, releasing of the pulling operation of the cable allows the locking pin to move, by a biasing force of the coil spring, in a direction in which the locking pin protrudes from the housing. Furthermore, the linking member is disposed in the housing such that an actuation plane, wherein the linking member is actuated in order to operate the locking pin, is parallel to the axis of the locking pin.

The housing includes a locking pin housing part, which houses the locking pin, and a link housing part, which houses the linking member; a space is formed interposed between the locking pin housing part and the link housing part; and when the housing is rotated and fixed to the fixed target, the link housing part is, at a fixed ending period, positioned into a space which has been defined at a fixed starting period.

In the present invention, the housing is fixed to the fixed target by mating the mating and fixing part to the fixed target and then rotating the mating and fixing part. At this time, the housing is rotated such that the link housing part is moved to the space interposed between the locking pin housing part and the link housing part. Thereby, of the housing that houses the lid lock apparatus, the link housing part is moved in advance such that it is located in the space provided between the locking pin housing part and the link housing part, which makes it possible to mount the lid lock apparatus in a limited space.

In a lid lock apparatus, the external shape of the housing in a cross section orthogonal to the movement directions of the locking pin can be made substantially L shaped. In this case, if the housing is rotated about the locking pin housing part and thereby mated and fixed to the fixed target, then the link housing part can be moved at the fixed ending period such that it is located in space which has been formed by the substantially L shape.

In a lid lock apparatus, the locking pin is dividable and includes a mating structure having one part stored in the housing and the other part which is stored into the housing through a protruding hole of the housing for mating with the one part in the housing. In this case, in a state wherein one of the divided parts of the divided locking pin is stored inside the housing, the housing is mated and fixed to the fixed target, after which the other of the divided parts of the locking pin is inserted from the outside and mated with the one in the housing. Thereby, it is possible to reduce the size of the housing more than in the case wherein the locking pin is stored in advance inside the housing.

A lid lock apparatus according to the present invention can be fixed to a vehicle body that has limited space.

DETAILED DESCRIPTION OF EMBODIMENTS

Embodiments (1) First Embodiment

Figure 2:
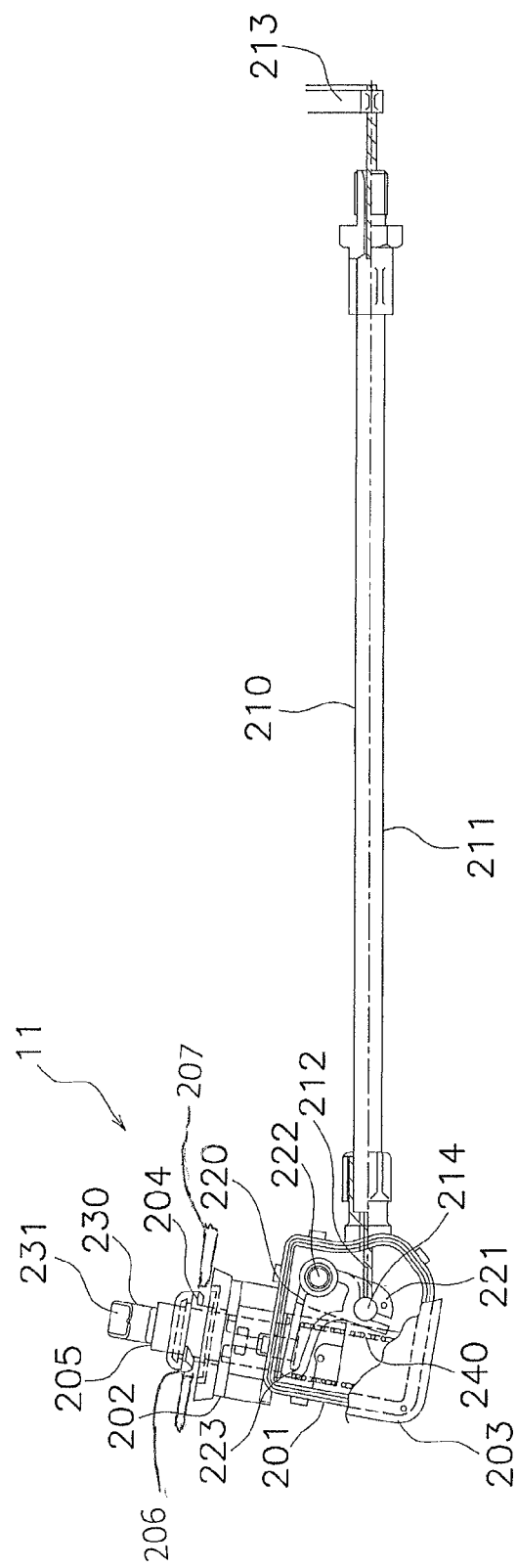
FIG. 2 is an explanatory diagram of the lid lock apparatus according to a first disclosed embodiment.
Figure 3:
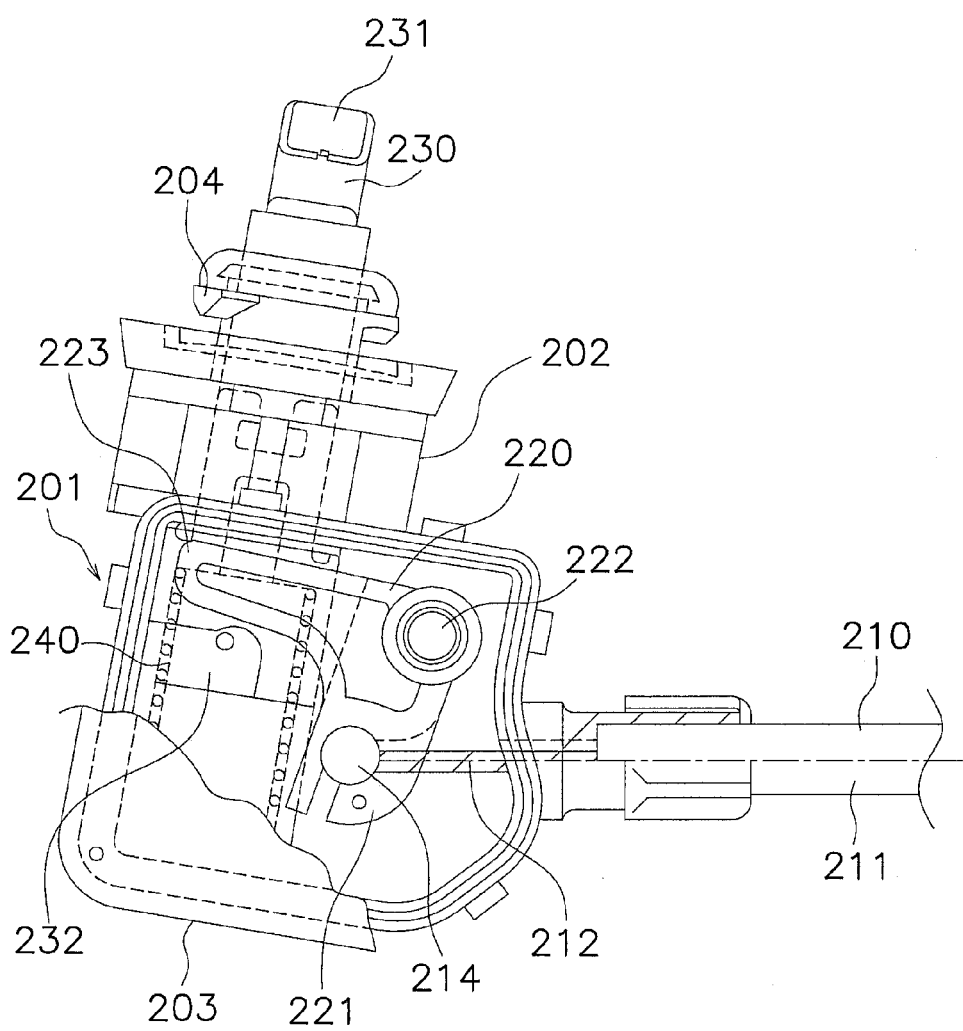
FIG. 3 is an enlarged explanatory view of the principal parts of the lid lock apparatus.
Figure 4:
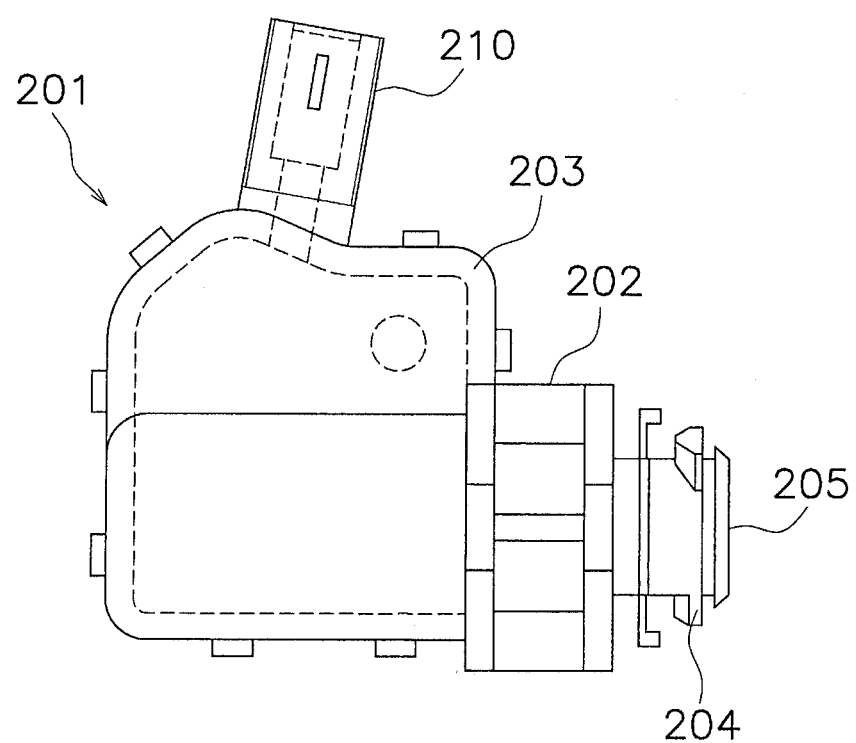
FIG. 4 is a front view of the lid lock apparatus.
Figure 5:
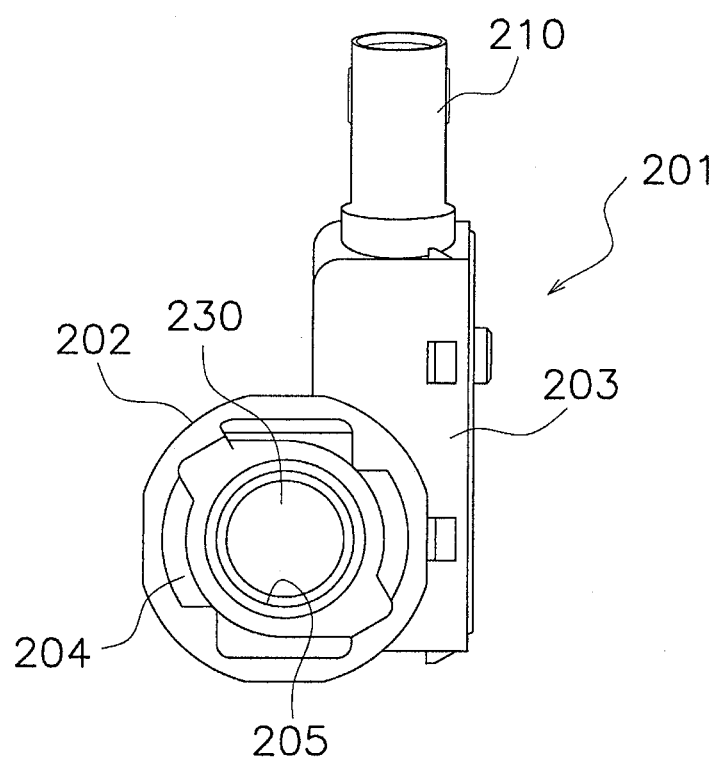
FIG. 5 is a side view of the lid lock apparatus.

FIG. 2 is an explanatory diagram of a lid lock apparatus according to a first embodiment of the present invention; FIG. 3 is an enlarged explanatory view of the principal parts of the lid lock apparatus; FIG. 4 is a front view of the lid lock apparatus; and FIG. 5 is a side view of the lid lock apparatus.

Figure 1:
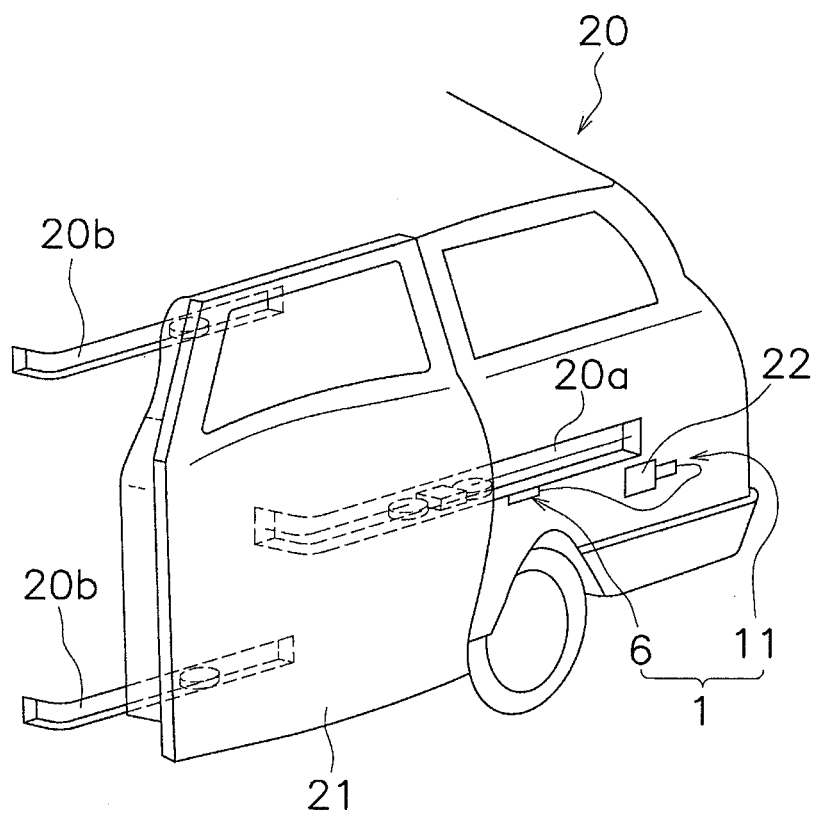
FIG. 1 is a schematic explanatory view of a vehicle body wherein a lid lock apparatus is used in a vehicle.

As shown in FIG. 2, a motion converting mechanism 11 includes a locking pin 230, a cable 210, a linking member 220, and a housing 201. The locking pin 230 is engageably and detachably provided to a fuel lid 22 (refer to FIG. 1), which is mounted to a side surface of a vehicle body 20. The cable 210 is for operating the locking pin 230 and includes a tubular outer cable 211 and an inner cable 212, which is capable of sliding inside the outer cable 211. One end of the inner cable 212 is fixed to an operation unit 213, which is for releasing a lock state between the locking pin 230 and the fuel lid 22. A cable end 214, which is another end of the inner cable 212, is fixed to the linking member 220.

The linking member 220 transmits, to the locking pin 230, an operating force that is applied to the cable 210. The linking member 220 includes: a locking pin connecting part 223, which is connected to the locking pin 230; and a cable connecting part 221, which is connected to the cable end 214 of the cable 210. The linking member 220 is rotatably supported by a support shaft 222, which is located midway between the locking pin connecting part 223 and the cable connecting part 221.

The housing 201 houses the locking pin 230 and the linking member 220. The housing 201 includes: a locking pin housing part 202, which houses the locking pin 230; and a link housing part 203, which houses the linking member 220. The locking pin housing part 202 is formed into a substantially circular cylinder and slidably houses the locking pin 230. At a tip of the locking pin housing part 202 are provided a protruding hole 205, which allows the locking pin 230 to protrude therethrough, and a mating and fixing part 204, which is capable of mating to a mating part 206 of a fixed target 207.

A lock engaging part 231, which protrudes externally from the protruding hole 205 of the locking pin housing part 202 and is capable of engaging with the fuel lid 22, is formed at one end part of the locking pin 230. In addition, the locking pin 230 passes through and is housed inside the locking pin housing part 202; furthermore, a link engaging part 232, which is located in the link housing part 203, is formed at another end part of the locking pin 230.

Furthermore, a coil spring 240 is mounted to the locking pin 230, and the lock engaging part 231 is biased in the direction in which the lock engaging part 231 protrudes from the protruding hole 205. Specifically, the coil spring 240 is housed inside the housing 201. Part of a one end side of the coil spring 240 is housed in a hole that is provided in the other end part side of the locking pin 230 so that the coil spring 240 is coaxial with the locking pin 230, and another end of the coil spring 240 abuts an inner surface of the housing 201.

The linking member 220 is supported such that it can rotate with respect to the housing 201 owing to the support shaft 222, and rotates about the support shaft 222 in correspondence with the push-pull motion of the inner cable 212 of the cable 210. Specifically, the linking member 220 is disposed such that, in the housing 201, an actuation plane, wherein the linking member 220 is actuated in order to operate the locking pin 230, is parallel with the axis of the locking pin 230. The locking pin connecting part 223 of the linking member 220 engages with the link engaging part 232 of the locking pin 230.

When the inner cable 212 is pulled to the operation unit 213 side, the linking member 220 rotates in the counterclockwise direction with reference to FIG. 3. Thereby, the locking pin connecting part 223 of the linking member 220 is actuated by the link engaging part 232 of the locking pin 230, and moves the locking pin 230 against the biasing of the coil spring 240. Thereby, the lock engaging part 231 of the locking pin 230 is retracted into the protruding hole 205 of the locking pin housing part 202, the engagement with the fuel lid 22 is released, so that the locking of the fuel lid 22 is released.

(2) Mounting Process

Figure 6:
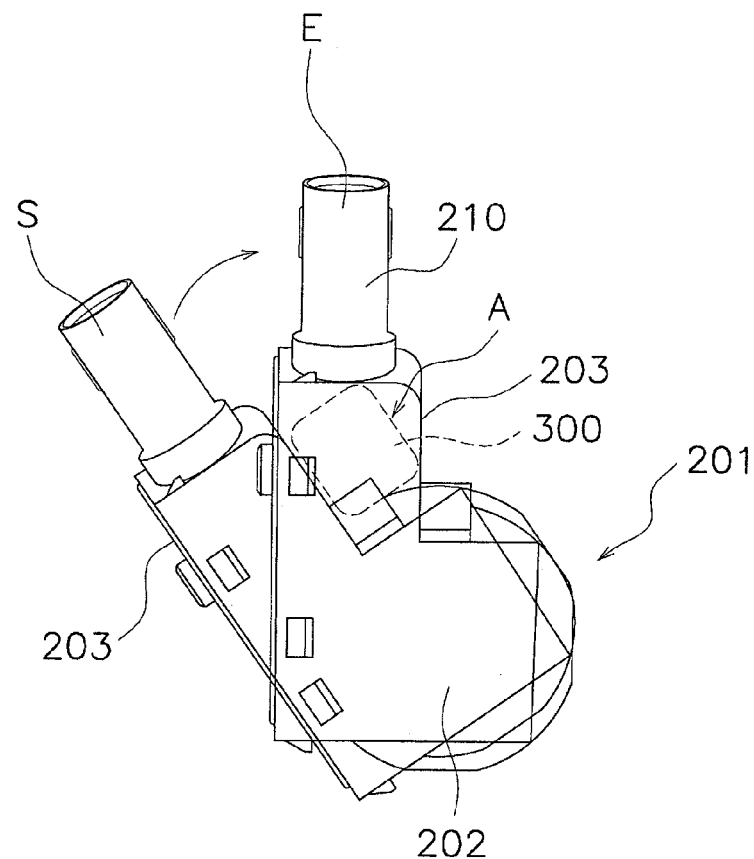
FIG. 6 is an explanatory diagram that shows the operation that is performed when the lid lock apparatus is mounted to a fixed target.

FIG. 6 is an explanatory diagram that shows the actuation when the lid lock apparatus is mounted to the fixed target.

As shown in the drawing, the locking pin housing part 202 and the link housing part 203 are disposed in a substantially L shaped arrangement, viewed from the axial directions of the locking pin 230; furthermore, a space 300, which is interposed between the locking pin housing part 202 and the link housing part 203, is formed. The housing 201 can be fixed to the fixed target by inserting the mating and fixing part 204, which is formed at the tip of the locking pin housing part 202, into the mating part 206 of the fixed target 207 (See FIG. 2) and then rotating the mating and fixing part 204 by a prescribed angle.

As shown in FIG. 6, when the housing 201 is fixed to the fixed target, first, the housing 201 is positioned at a fixed starting position S. At this time, as shown in the drawing, the space 300 is located at a starting position A.

Next, the housing 201 is positioned at a fixed ending position E by rotating, about the locking pin 230, the housing 201 in the clockwise direction of the figure. Thereby, the mating and fixing part 204 can be mated and fixed to the mating part of the fixed target. If the housing 201 is located at the fixed ending position E, then, as shown in FIG. 6, the link housing part 203 is located at the starting position A of the space 300.

As discussed above, the housing 201 is fixed to the fixed target by mating the mating and fixing part 204 to the fixed target and then rotating the mating and fixing part 204. At this time, the housing 201 is rotated such that the link housing part 203 is moved to the space 300 interposed between the locking pin housing part 202 and the link housing part 203. Thereby, of the housing 201 that houses the lid lock apparatus 1, part of the link housing part 203 is moved in advance such that it is located in the space 300 provided between the locking pin housing part 202 and the link housing part 203 and is thereby fixed, which makes it possible to reduce the space needed to rotate the housing 201 when mounting the motion converting mechanism 11, and to mount the lid lock apparatus 1 in a limited space. As a result, the lid lock apparatus 1 makes it possible to make the shape of the housing 201 compact and can be mounted to a vehicle body wherein space is limited.

In the present embodiment, the external shape of the housing 201 in a cross section that is orthogonal to the movement directions of the locking pin 230 is substantially L shaped, but the present invention is not limited to this embodiment. In addition, the shape of the space is not limited to the abovementioned embodiment. Furthermore, the specific shape and arrangement of the linking member 220, the locking pin 230, and the coil spring 240, which are the members inside the housing 201, are not limited to the abovementioned embodiment.

(3) Second Embodiment

Figure 7:
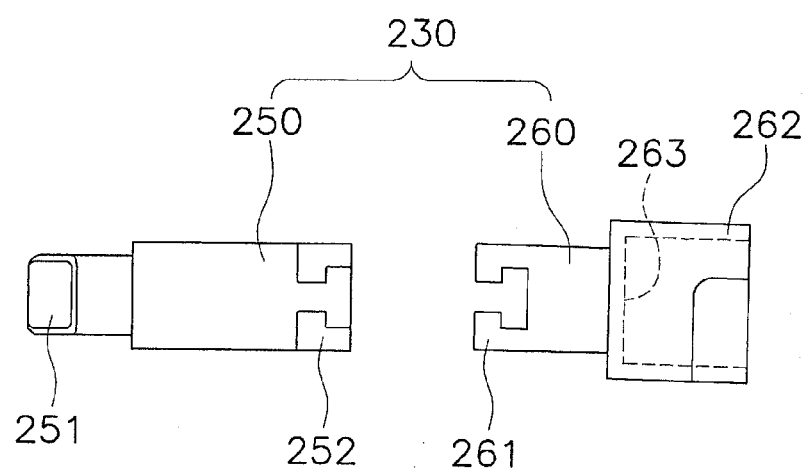
FIG. 7 is an explanatory diagram of a locking pin that is used in a second disclosed embodiment.

FIG. 7 is an explanatory diagram of a locking pin that is used in a second embodiment of the present invention.

In the lid lock apparatus 1 according to the first embodiment, it is possible to divide the locking pin 230. As shown in FIG. 7, the locking pin 230 includes a first pin 250 and a second pin 260.

The first pin 250 is capable of being housed in the locking pin housing part 202 such that one end part of the first pin 250 protrudes externally from the protruding hole 205 of the locking pin housing part 202. The one end part of the first pin 250 includes a lock engaging part 251, which is capable of engaging with the fuel lid 22. Another end part of the first pin 250 includes a first mating part 252, which is capable of mating to the second pin 260.

One end part of the second pin 260 has, at a side surface thereof, a link engaging part 262, which is capable of engaging with the locking pin connecting part 223 of the linking member 220, and has a coil spring housing hole 263, which is capable of storing part of the coil spring 240. In addition, another end part of the second pin 260 includes a second mating part 261, which is capable of mating to the first pin 250.

The second pin 260 is housed in advance in the locking pin housing part 202 in a state wherein the link engaging part 262 of the second pin 260 and the locking pin connecting part 223 of the linking member 220 are engaged. In this state, the first mating part 252 and the second mating part 261 are mated together by inserting the first pin 250 via the protruding hole 205 of the locking pin housing part 202.

Based on such a configuration, it is no longer necessary to make the size of the housing 201 greater than or equal to the total length of the locking pin 230, making it possible to make the housing 201 compact. Furthermore, it is also possible to house the first pin 250 in advance in the locking pin housing part 202 and to mate the second pin 260 with the interior of the housing 201 by inserting the second pin 260 from the rear part of the locking pin housing part 202.

In this case, too, it is no longer necessary to set the size of the housing 201 such that it is greater than or equal to the total length of the locking pin 230, which makes it possible to make the housing 201 compact. However, in this configuration, an opening for inserting the second pin 260 is necessary, which makes it difficult to make the structure waterproof.

(4) Other Embodiments

The above text explained one embodiment of the present invention, but the present invention is not limited to the abovementioned embodiment, and variations and modifications may be effected without departing from the spirit of the invention. In particular, the embodiments and modified examples written in the present specification can be arbitrarily combined as needed.

The present invention can be adapted to the vehicle body of an automobile that has a fuel lid, a charging lid, and the like.

What is claimed is:
1. A lid lock apparatus, comprising:
a locking pin configured to engage with and detach from a lid;
a cable configured to operate the locking pin;
a linking member configured to transmit to the locking pin an operating force applied to the cable;
a housing configured to house the locking pin and the linking member;
a mating and fixing part configured to fix the housing to a fixed target by mating to the fixed target and being rotated; and
a coil spring configured to bias the locking pin in a direction in which the locking pin is pushed out of the housing;
the locking pin being disposed in the housing such that the locking pin can protrude from a protruding hole of the housing;
the linking member including a locking pin connecting part connected to the locking pin, and a cable connecting part connected to a cable end of the cable;
a pulling operation of the cable allowing the linking member to move in a direction in which the locking pin is stored in the housing, and, releasing of the pulling operation of the cable allows the locking pin to move, by a biasing force of the coil spring, in a direction in which the locking pin is pushed out of the housing;
the linking member being disposed in the housing such that an actuation plane, wherein the linking member is actuated in order to operate the locking pin, is parallel to a longitudinal axis of the locking pin; and the housing including a locking pin housing part, which houses the locking pin, and a link housing part, which houses the linking member; wherein a space is formed interposed between the locking pin housing part and the link housing part; wherein when the housing is rotated and fixed to the fixed target, the space is defined at a fixed starting position and the housing is rotated around an axial direction of the locking pin such that the link housing part is, at a fixed ending position, positioned into the space which has been defined at the fixed starting position; and wherein an external shape of the locking pin housing part and the link housing part in a cross section orthogonal to the movement directions of the locking pin is substantially L shaped.

2. A lid lock apparatus according to claim 1, wherein the locking pin is dividable and includes a mating structure having one part stored in the housing and the other part which is stored into the housing through a protruding hole of the housing for mating with the one part in the housing.

3. A lid lock apparatus according to claim 1, wherein a mating and fixing part is formed at a tip of the locking pin housing part, the mating and fixing part is inserted into a mating part of the fixed target and is rotated by a prescribed degree to be mated with the mating part of the fixed target.

* * * * *